UNITED STATES PATENT OFFICE.

ALFRED EINHORN, OF MUNICH, GERMANY, ASSIGNOR TO THE FARBWERKE, VORMALS MEISTER, LUCIUS & BRÜNING, OF HÖCHST-ON-THE-MAIN, GERMANY.

GLYCOCOLPHENOLESTER AND PROCESS OF MAKING SAME.

SPECIFICATION forming part of Letters Patent No. 624,772, dated May 9, 1899.

Application filed February 28, 1899. Serial No. 707,217. (Specimens.)

*To all whom it may concern:*

Be it known that I, ALFRED EINHORN, Ph.D., professor of chemistry, a citizen of the Empire of Germany, residing at Munich, Germany, have invented certain new and useful Improvements in the Manufacture of Glycocolphenolesters, of which the following is a specification.

I have found that by the action of secondary amins upon halogenacetic acidesters of "phenols" new compounds may be obtained which are valuable for medicinal purposes. According to their formation they have the following constitution:

$$\text{Alphyl-O-COCH}_2\text{-NX}_2,$$

wherein $NX_2$ represents the residue of a secondary amin. They are to be designated as "glycocolphenolesters." These glycocolphenolesters are obtained by mixing halogenacetic acidesters of phenols with secondary bases. The reaction takes place by itself while evolving heat, which it is preferable to moderate by cooling, or by an addition of a diluting agent, such as benzene. The glycocolphenolesters thus formed may be extracted with ether from the product of reaction after adding a dilute solution of soda.

The glycocolphenolesters are thick oils, easily soluble in alcohol, ether, and benzene, soluble with difficulty in water, and form with acids well-crystallizing salts. They decompose on being heated with alkalies or acids under reformation of phenols. The salts of the glycocolphenolesters are soluble in water, inodorous, non-poisonous, and act as powerful antiseptics.

I illustrate my process by the following example:

To forty-three parts, by weight, of chloraceticacidguaiacolester are added thirty-five parts, by weight, of diethylamin while stirring, and the reaction thus resulting is moderated by cooling with ice. The chloraceticacidguaiacolester dissolves gradually, and after some hours the gelatinous mass is treated with a dilute solution of soda and extracted with ether. After having shaken the ether with dilute sodalye to remove the regenerated guaiacol it leaves behind the glycocolguaiacolester as a thick oil. The chlorhydrate of this ester is in form of prisms, melting at 184°, and the brom-hydrate, in form of needles, melting at 208° centigrade. Alkalies decompose the ester under reformation of guaiacol. In an analogous manner the glycocolesters of other phenols—such as phenols, cresols, and creosols—may be obtained.

Having now described my invention, what I claim is—

1. The herein-described process for the manufacture of glycocolphenolesters of the general formula, alphyl-O-COCH$_2$-NX$_2$, wherein $NX_2$ represents the residue of a secondary amin, which consists in mixing halogenaceticacidphenolesters with secondary amins, substantially as described.

2. As new products the glycocolphenolesters of the general formula, alphyl-O-COCH$_2$-NX$_2$, being thick oils, easily soluble in alcohol, ether and benzene, little soluble in water, forming with acids salts soluble in water and which on being heated with alkalies or acids are decomposed under reformation of phenols.

3. The herein-described process for the manufacture of diethylglycocolguaiacolester, which consists in mixing chloracetylguaiacol with diethylamin, substantially as described.

4. As a new product, the diethylglycocolguaiacolester, being a thick oil, easily soluble in alcohol, ether and benzene, little soluble in water, its chlorhydrate melting at 184° centigrade and its brom-hydrate at 204° centigrade, decomposing on being heated with alkalies under formation of guaiacol.

In testimony that I claim the foregoing as my invention I have signed my name in presence of two subscribing witnesses.

ALFRED EINHORN.

Witnesses:
  EMIL HENZEL,
  CLZALL WEIMER.